United States Patent [11] 3,615,840

| [72] | Inventor | William R. Wolfe, Jr.<br>Wilmington, Del. |
|---|---|---|
| [21] | Appl. No. | 746,325 |
| [22] | Filed | July 22, 1968 |
| [45] | Patented | Oct. 26, 1971 |
| [73] | Assignee | E. I. du Pont de Nemours and Company<br>Wilmington, Del. |

[54] FUEL CELL AND FUEL CELL ELECTRODE COMPRISING A SULFURATED COMPOUND OF TUNGSTEN AND OXYGEN
9 Claims, No Drawings

[52] U.S. Cl. .................................................. 136/86 D,
136/120 FC
[51] Int. Cl. .................................................. H01m 27/04,
H01m 13/00
[50] Field of Search .................................................. 136/86,
120, 120 FC, 86 D; 252/439

[56] References Cited
UNITED STATES PATENTS

| 3,198,667 | 8/1965 | Gladrow | 136/122 |
| 3,284,332 | 11/1966 | Gladrow | 136/120 UX |
| 3,451,856 | 6/1969 | Fraase et al. | 136/120 |
| 3,480,479 | 11/1969 | Nestor | 136/86 |

FOREIGN PATENTS

| 900,451 | 7/1962 | Great Britain | 136/86 |
| 1,089,104 | 11/1967 | Great Britain | 136/120 |

Primary Examiner—Winston A. Douglas
Assistant Examiner—M. J. Andrews
Attorney—Herbert M. Wolfson ABSTRACT: A relatively inexpensive catalyst for a fuel cell electrode, particularly useful with acid electrolytes, is an acid-insoluble solid material composed of at least one compound of tungsten and oxygen wherein the valence of tungsten ranges from four to six and at least one sulfurated compound of tungsten, wherein tungsten has a valence of four, e.g., tungsten disulfide, at least the exposed regions of said solid material containing said sulfurated compound of tungsten, the ratio of oxygen-to-sulfur in said solid material being 80:1–1:80.

FUEL CELL AND FUEL CELL ELECTRODE COMPRISING A SULFURATED COMPOUND OF TUNGSTEN AND OXYGEN

RELATED APPLICATIONS

The following applications are referred to in this specification: Ser. No. 348,165 filed Feb. 28, 1964, now abandoned; Ser. No. 609,776 filed Jan. 17, 1967, now abandoned; Ser. No. 639,515 filed May 19, 1967, now abandoned.

BACKGROUND OF INVENTION

This invention relates to improved fuel cells, and more particularly the invention relates to the anodes used in fuel cells.

Fuel cell, as used herein, refers to a device capable of generating electrical energy from the oxidation of a fuel. Specifically, a fuel cell comprises a housing, two electrically conductive electrodes consisting of or impregnated with a catalytic material, connecting means associated with each electrode for establishing electrical contact with an external circuit and an electrolyte which acts as a transferring medium for ions. An oxidizing gas such as air is supplied to the oxidant electrode (the cathode); and a fuel, such as hydrogen, methanol, formaldehyde, etc. is supplied to the fuel electrode (the anode). At the cathode, electrons are consumed to convert the oxidant into ions; and at the anode, the fuel is oxidized with the release of electrons. There is, therefore, a net flow of electrons from the anode to the cathode through the external electrical-conductive circuit. If the electrolyte is alkaline, then negative ions migrate to the anode to take part in the oxidation reaction. If the electrolyte is acid, then positive ions migrate to the cathode to take part in the reduction reaction.

Heretofore, the most successful anodes for use in fuel cells have either been formed of very expensive materials or have contained such materials as catalysts. Platinum, palladium, rhodium, silver and compounds of such materials have been used as anode catalysts and have tended to make the fuel cell commercially unattractive. Although less expensive materials have been suggested, none has provided sufficiently low cost per unit power, particularly for use with the more desirable acid electrolytes, to compete with platinum and the like for use as anodic catalysts in fuel cells.

SUMMARY OF INVENTION

A fuel cell electrode having as a catalyst an acid-insoluble solid material composed of tungstates and oxides of tungsten, wherein the valence of tungsten is from four to six, and at least one sulfurated compound of tungsten (tungsten disulfide or oxysulfide compound of tungsten), at least the exposed regions of said solid material containing said sulfurated compound of tungsten, the ratio of oxygen-to-sulfur in said solid material being 80:1–1:80. The catalyst is particularly effective in converting fuels such as hydrogen, formaldehyde and paraformaldehyde to protons or to protons and carbon dioxide in the presence of such acids as sulfuric acid or hydrochloric acid.

DETAILS OF THE INVENTION

In its broadest sense, the present invention provides a fuel cell in which the anode catalyst is an acid-insoluble solid material (substantially insoluble in 15 percent hydrochloric acid at a temperature of 90° C.) which is composed of at least one tungstate or oxide of tungsten and/or mixtures thereof, said oxides and tungstates being characterized in that the valence of tungsten ranges from four to six and in intimate contact with said oxygen containing material a tungsten sulfide being insoluble in electrolyte and having as an essential a sulfurated compound (a sulfide or oxygen sulfide wherein the valence of tungsten is four and preferably tungsten disulfide. The ratio of oxygen to sulfur in the catalyst material can range between 1:80 and 80:1 and preferably between 1:8 and 20:1.

The sulfurated compound of tungsten can be either insoluble tungsten disulfide or oxides of tungsten having sulfur atoms substituted for oxygen in the crystal lattice. Locating the sulfurated tungsten compounds in the regions of the solid material that are exposed to (in contact with) the electrolyte is important in the operability of the catalyst. Thus, when the sulfurated compound is tungsten disulfide, it should be present as a coating or layer on the oxygen containing tungsten base so that it is distinguishable, microscopically or analytically, from the interior of the solid material. When sulfur is partially substituted for oxygen in the lattice of the oxide, such substitution should occur primarily in the outer layer of the oxide. When such substitution occurs, there is clear continuity between the outer and the inner regions of the solid material. In either case, there must be such intimacy between the outer sulfurated regions and the inner layers that would facilitate the conduction of the electrons between the regions. Simple mixing of tungsten sulfides with the oxide base materials while giving some activity do not produce attractively active catalysts for use in the present application.

The catalyst can be composed of individual particles of the acid-insoluble solid material, as defined previously, so that each particle is catalytically active. Alternatively, the catalyst can be a relatively large sheet of the tungsten oxygen layer having a sulfurated compound in its outer layer. This latter structure provides the minimum sulfur content that can be present in the catalyst. In a sheet of the oxide having a monomolecular outer region composed of the sulfurated compound, e.g., tungsten disulfide of monomolecular thickness over tungsten oxide sheet, the sulfur content would correspond to an oxygen: sulfur ratio of 80 to 1. The maximum sulfur content would occur in tiny platelets of the oxide of tungsten in which the outer regions are predominately sulfurated or in larger oxide particles in which sulfuration penetrates deeply but not completely. In both of these latter cases, the catalyst would be operable in the present invention and the oxygen-sulfur ratio could be as high as 1 to 80.

CATALYST PREPARATION

Generally, any method for incorporating tungsten oxides and tungstates with sulfides or oxysulfides is suitable for the preparation of the catalyst used in this invention, but however, preferred conditions for preparing the most active catalyst involves treating tungstate such as ammonium metatungstate $[(NH_4)_2W_4O_{13} \cdot 8H_2O]$ with a sulfurizing compound such as elemental sulfur, a reactive sulfide, for example, hydrogen sulfide, in a reducing atmosphere to convert the metal salt to the oxide of tungsten coated with the oxysulfide or sulfide of tungsten. The product normally contains some elemental sulfur as well which can be removed if desired. The conversion can be carried out on the surface of a conductor, e.g., on porous carbon to form the electrode with its associated catalyst and thus, avoid a subsequent step of applying catalyst to the electrode.

Other methods of producing the catalyst for use in this invention involve heating mixtures of sulfides and oxides of tungstens at elevated temperatures, for example, in the range of 400° to 600° C. with fast cooling. Still another method involves treating a suspension of the oxide with a solution of the sulfide to yield the insoluble product. Where the oxide of tungsten is used as a starting material in the preparation of the catalyst, it can be any of the stoichio-metric oxides $WO_2$, or nonstoichiometric oxides ($W_{10}O_{29}$; $W_4O_{11}$; $W_2O_5$ etc.), alkali metal tungstates, metatungstates, paratungstates, parts of isopoly and heteropoly acid, phosphotungstates, silicotungstates, etc. It is generally hypothesized that the tungsten-oxygen base should be essentially a nonstoichiometric defect lattice structure having good conductivities for electron transfer from the sulfides through to the electrode. Conditions for forming defect lattice structures from the oxides and tungstates are such that high temperatures are to be avoided in the preparation. A general rule which might aid in the production of the oxide sulfide catalyst is that temperatures exceeding about 750° C. should be avoided.

The chemical composition of the acid-insoluble solid material produced by the foregoing methods may be determined by X-ray diffraction techniques or by conventional chemical analysis or other methods known to those skilled in the art. Wet analytical data provide sulfur content and the average valence of tungsten; and the X-ray analysis discloses the general species present and the amount of combined sulfur. The structure of the material, wherein the outer regions of the particles contain sulfurated compounds of tungsten, may be verified by examination using techniques that involve the use of the electron microscope or the electron beam microprobe or the like. It should be understood that all the production methods may produce elemental sulfur along with the desirable catalytic material. This free sulfur is not includes in determining the oxygen-to-sulfur content set forth in the examples and claims.

It will be apparent that where sheets of the catalyst are to be produced, the processes of production are more limited. The preferred method is to treat a sheet of the oxide with sulfur, hydrogen sulfide or other reactive sulfides so that the exposed regions of the sheet are sulfurated. It is also possible to produce the sheets by compressing previously produced particles of the catalytic material.

Where particles of the acid-insoluble solid material, as defined previously, are produced, such particles will range in size from 1 to 600 microns. However, the invention is not so limited since smaller and larger particles will also form active catalysts. It should also be pointed out that size reduction after the catalyst has been formed is not desirable. Grinding or milling the acid-insoluble solid material tends to change the sulfide distribution in the particle and may relocate the sulfurated regions inwardly.

ANODE PREPARATION

The anode of this invention is preferably composed of a base stratum that is usually an electrically conductive material, chemically resistant to the electrolyte, which supports the previously described catalytic material. Although any electrically conductive material including gold and those metals of Group VIII of the Periodic Table that are resistant to the electrolyte would be operable, it is preferred to use materials that are relatively inexpensive in order to retain the basic advantages of the catalyst. Thus, some transition metals, like tungsten and tantalum, may be used as such or in alloys thereof, e.g., stainless steel, nickel-aluminum alloys, etc. In addition, suitable electrodes may be formed from metal oxides, carbon, carbides, conductive ceramics, conductive polymeric compositions or the metal/silicon combinations disclosed in U.S. Pat. No. 3,297,487. The electrode base stratum may be used in sheet, rod or cylinder form or, preferably in the form of a porous or foraminous base, e.g., screen, mesh, wool, etc. to provide maximum surface area.

The catalystic material may be incorporated in a binder and the combination may be applied to the electrically conductive base stratum under pressure. As the binder material, such polymers as chlorinated butyl rubber, polystyrene, polymethyl methacrylate, polyethylene terephthalate, polyvinyl chloride, polyvinyl fluoride, polytetrafluoroethylene and other fluorocarbon polymers, polyurethanes, polybutadiene, polyisoprene, polyamides, polyimides, chlorosulfonated polyethylene, chlorinated polyethylenes, and the like may be used.

In the most desirable system, the catalytic material is used as part of a bipolar conductor system. Bipolar conductor systems offer the following advantages: the fuel cell design is simplified; the construction can be compact; and external cell connection losses are minimized. These advantages are discussed in 15th Annular Power Sources Conference Proceedings, 1961; pages 31–32 of "Liquid Alkaline Fuel Cells" by P. G. Grimes et al. The bipolar electrode may be formed from the materials useful in the present intervention by depositing the catalytic material on a support of porous graphite or carbon or the like, the supporting material acting as one side (the anode) of a conductor while the reverse side acts as the cathode.

It should be understood, however, that it is not necessary that the catalytic material be incorporated with the electrode. Particles of the catalytic material may be suspended in the anolyte (the electrolyte in contact with the anode) as described in U.S. Pat. application, Ser. No. 348,165, filed Feb. 28, 1964 now abandoned. Alternatively, the catalytic material, being electrically conductive, can be used as the electrode itself. Specifically, it can be pressed, with or without a polymeric binder, into a form for receiving an electrical lead; or it can be used in particulate form in a gas dispersion tube.

ELECTROLYTES

The electrolytes used in the fuel cells and half cells of this invention can be any of those commonly used which are compatible with the particular fuels, oxidants, permeable membranes, etc. being used. They will usually be aqueous mixtures of adequate conductivity for the ions involved in the half cell reactions. The useful aqueous electrolytes include solutions of the alkali metal hydroxides, e.g., potassium hydroxide, sodium hydroxide; the common acids, e.g., sulfunic acid, phosphoric acid, hydrochloric acid; alkaline salts, e.g., the chlorides, sulfates or carbonates of sodium potassium or lithium, etc. The concentrations involved will usually be chosen for high conductivity and convenient handling. For the purpose of the present invention, acidic electrolytes are preferred. In such electrolytes, gaseous waste products are produced which are readily removed. Specifically, 5–45 percent sulfuric acid, 10–85 percent phosphoric acid and 5–15 percent hydrochloric acid are recommended.

While it will usually be desirable to use the same electrolyte for the fuel and oxidant half cells in the fuel cell arrangements of this invention, the use of a common electrolyte is not essential. Two different electrolytes can be used by incorporating in the fuel cell design a suitable membrane which separates the electrolytes but permits adequate flow of ions between the half cells. A preferred class of ion-exchange membranes for use in the fuel cell of this invention are thin films of fluorinated copolymers having pendant sulfonic acid groups, preferably the copolymers of trifluorovinyl sulfonic acid and fluorinated ethylenes, as disclosed in copending U.S. Pat. application, Ser. No. 639,515, filed May 19, 1967 now abandoned. By using a suitable ion-permeable membrane, one-half cell can utilize a soluble fuel or oxidant in one electrolyte while the other half cell utilizes a gaseous or liquid fuel or oxidant, the membrane serving to prevent migration of the soluble fuel or oxidant to the other electrode.

FUELS AND OXIDANTS

The catalysts described are particularly useful with low molecular weight hydrogenous fuels such as hydrogen gas, formaldehyde and paraformaldehyde in acidic solutions. Fuels such as hydrogen, hydrazine, ammonia will work in alkaline media.

The oxidizing agents that can be used are preferably air and pure oxygen. Other oxidants which might be considered included a nitrogen oxide such as nitric oxide or nitrogen dioxide, sulfur dioxide, chlorine, liquid hydrogen peroxide, liquid organic peroxides, nitric acid, etc. As with the fuels, some of these oxidants will be more useful with particular electrolytes and cathode catalysts than with others.

It may be advantageous to use some of these oxidants in conjunction with a reducible salt dissolved in the electrolyte.

A preferred system employing oxygen as the oxidant and cupric chloride dissolved in a hydrochloric acid electrolyte is disclosed in U.S. Pat. application, Ser. No. 609,776 filed Jan. 17, 1967 now abandoned.

CATHODES

The cathode should be an electrical conductor, which will accept electrons and will provide a surface for the electrode reaction with or without the presence of a catalyst. Suitable electrodes meeting these requirements are well known and many are described for example in "Catalysis, Inorganic and Organic," Berkman, Morrel, and Egloff, Reinhold Publishing Co., New York (1940). Suitable electrode materials include electrodes formed from metals of Group VIII of the Periodic Table such as rhodium, palladium, iridium and platinum. In addition to the electrodes formed of these metals, the electrodes can be formed of platinum or palladium black which is deposited on a base metal such as stainless steel, iron, nickel and the like. In addition, suitable electrodes may be formed from the metal-silicon combination described in U.S. Pat. No. 3,297,487 or from metal oxides or from carbon which is activated with platinum or palladium. The preferred cathode materials for use with the previously disclosed cupric chloride-hydrochloric acid catholyte systems are those relatively inexpensive materials disclosed with reference to the anodes, e.g., tantalum, carbon, etc.

The electrode materials may be used in sheet form or in the form of screens, meshes, or porous metals. They may be combinations of solid electrodes coated with porous catalysts bound with organic materials and plastics. It is also possible to use a combination cathode and solid oxidant. For example, the lead dioxide plate such as used in a storage battery may be used in the fuel cell of the invention; or, at least as a means for testing the effectiveness of fuels in the presence of the anodes and catalysts of the invention.

The temperature of operation of the fuel cell can range from about 20° to about 150° C., the pressure being atmospheric or slightly above to raise the boiling point of the electrolyte. In general, more current can be drawn from a fuel cell at a constant potential when the temperature is increased. However, at temperatures above about 150° C. the corrosive action of the acidic electrolyte on metals in the fuel cell is accelerated.

Water generated by the electrochemical reactions should be removed to avoid undue dilution. This can be conveniently done at a temperature above 100° C. by having the entire cell attached to a condenser which selectively removes the proper amount of water.

The invention will be more clearly understood by referring to the examples which follow. These examples should not be considered to limit the invention in any way. Parts and percentages in the examples are by weight, unless otherwise stated.

EXAMPLE 1

100 g. of ammonium metatungstate [$(NH_4)_2 W_4O_{13}$ $8H_2O$] was thoroughly mixed with 22.7 g. of sulfur. 16 g. of this mixture in an alundum boat was placed in a quartz tube which was enclosed in a tube furnace. The system was purged with argon and then with hydrogen. The temperature was raised to 450° C. an maintained for 4.5 hours. The sample was cooled to room temperature in a hydrogen atmosphere and upon removal from the tube it had a blue-black color. The material was insoluble in 10percent $H_2SO_4$. The material was mixed with chlorinated natural rubber dissolved in benzene. The resulting mixture was painted on a 1 inches × 1 inches tantalum screen which had previously been equipped with a tantalum lead wire.

Operating the electrode under fuel cell conditions at 60° C. in 10 wt. percent sulfuric acid containing 10 percent formaldehyde and against a $PbO_2$ cathode the following electrode parameters were observed:

Electrode Potential vs. SCE* at Indicated Current (milliamps)

| Fuel | 0 | 1 ma. | 2 ma. |
|---|---|---|---|
| None | 0.34 | 0.38 | 0.425 |
| HCHO | 0.10 | 0.125 | 0.235 |

*Standard Calomel Electrode

The reduction in open circuit potential at zero current and the lower anode potential at a given current is indicative of catalytic activity for formaldehyde oxidation.

EXAMPLE 2

100 g. of ammonium metatungstate was thoroughly mixed with 20 g. of sulfur and a 16 g. batch of this mixture was placed in a combustion boat which, in turn, was placed in a tube furnace. After purging the system with helium, the atmosphere was changed to hydrogen. The furnace temperature was raised to 450° C. and maintained for 7 hours. After cooling the sample was removed and part of the catalyst*

* X-ray Analysis indicates: $(NH_4)_{0.06}WO_3(H_2O)_{0.11}$ Ammonium tungstate hydrate plus unidentified crystalline material fabricated into an electrode as described in example 1.

Operating the electrode under fuel cell conditions at 60° C. in 10 wt. percent sulfuric acid containing 10 percent formaldehyde and against a $PbO_2$ cathode the following electrode parameters where observed:

Electrode Potential vs. SCE at

Indicated Current

| Fuel | 0 | 2 | 4 | 6 ma. |
|---|---|---|---|---|
| None X | 0.40 | 0.56 | 0.76 | — |
| HCHO | 0.16 | 0.24 | 0.38 | 0.62 |

The reduction in open circuit potential at zero current and the lower anode potential at a given current is indicative of catalytic activity for formaldehyde oxidation.

EXAMPLE 3

A porous graphite disc, three-sixteenths inch thick and 1⅛ inch in diameter was fired for 1 hour at 900° C. in a $CO_2$ atmosphere. The disc was weighed and then placed in a muffle furnace in such a manner that one side was facing the door. The electrode was sprayed with a 25 weight per cent ammonium metatungstate solution until 4.564 g. of catalyst precursor was put down on one side of the graphite disc. The coated disc was placed in a quartz tube in a tube furnace and the tube purged with helium. After the helium purge, $H_2S$ was admitted to the system. The temperature of the sample was slowly raised to 400° C. and maintained for 4 hours. After cooling, it was found that the electrode had undergone a weight gain of 0.0758 g. giving a total catalyst weight of 4.64 g. The catalyst was insoluble in 10percent $H_2SO_4$.

The electrode was equipped with a tantalum lead wire and operated under fuel cell conditions in 10 percent by weight $H_2SO_4$ containing 10 percent formaldehyde and using a $PbO_2$ cathode. The following results were obtained.

Electrode Potential vs. SCE at
Indicated Current Density

| Fuel | 0 | 2 | 5 | 10 | 15 ma./cm.$^2$ |
|---|---|---|---|---|---|
| None (60° C.) | 0.18 | 0.60 | — | — | — |
| HCHO (60° C.) | 0.14 | 0.22 | 0.38 | 0.55 | — |
| HCHO (90° C.) | 0.15 | 0.18 | 0.24 | 0.38 | 0.53 |

EXAMPLE 4

A series of catalysts were made as described in example 2 in which varying ammonium metatungstate:sulfur ratio mixtures were used as the precursor, e.g., 6:1 (I), 4:8:1 (II), and 4:1 (III). The catalysts were formed into electrodes by thoroughly mixing 2.0 g. of catalysts, 1.5 g. tantalum wool and 0.2 g. of T-7 "Teflon" polytetrafluoroethylene resin and pressing the mixture on a 1 inch diameter tantalum screen at 60 K. lb. on a 1 inch diameter ram.

The anodes were evaluated under fuel cell conditions using a driven cathode in 2.5 normal HCl at 85° C. The following results were obtained using formaldehyde as the fuel in concentrations up to 10 percent:

| Catalyst ma/cm.$^2$ | Electrode Potential vs. SCE at Indicated Current Density | | | | | | | |
|---|---|---|---|---|---|---|---|---|
| | 0 | 5 | 10 | 15 | 20 | 25 | 30 | 35 |
| 6:1 (I) | −0.05 | −0.03 | +0.01 | +0.05 | 0.10 | 0.18 | 0.27 | 0.37 |
| 4.8:1 (II) | −0.02 | +0.00 | +0.03 | +0.07 | 0.11 | 0.17 | 0.23 | 0.30 |
| 4:1 (III) | +0.05 | +0.10 | +0.20 | +0.325 | 0.40 | | | |

The results with the 4.8:1 (II) catalysts using paraformaldehyde as the fuel are presented below:

| Catalyst ma/cm.$^2$ | 0 | 5 | 10 | 15 | 20 | 25 | 30 | 35 |
|---|---|---|---|---|---|---|---|---|
| 4.8:1 (II) | −0.12 | −0.08 | −0.02 | 0.05 | 0.14 | 0.23 | 0.32 | 0.41 |

Analysis of Catalysts

Chemical

| Catalyst | %Tungsten | %Oxygen | %Sulfur |
|---|---|---|---|
| (I) | | | |
| (II) | 77.13 | 19.0 | 0.66 |
| (III) | 74.16 | 19.6 | 0.255 |

EXAMPLE 5

Two tungsten-based catalysts were prepared from $WO_3$ using $H_2S$ as the sulfurizing agent. $WO_3$ was placed in a combustion boat in a tube furnace and heated to 400° C. in a helium atmosphere. Sample I was treated with $H_2S$ for one hour whereas Sample II was treated for ½ hour.

Using the electrode construction as described in example 4 the following results were obtained using 100 ml. of 37 percent formaldehyde solution in 300 ml. of 2.5 N HCl. The data were gathered at 85° C. and the cathode was driven.

Electrode Potential vs. SCE at
Indicated Current Density

| Catalyst | 0 | 5 | 10 | 15 ma./cm.$^2$ |
|---|---|---|---|---|
| I | −0.09 | 0.16 | 0.40 | — |
| II | +0.06 | 0.12 | 0.175 | 0.275 |

Analysis

| Catalyst | %W | %O | %S | X-ray |
|---|---|---|---|---|
| I | 61.73 | 7.6 | 23.95 | Strong $WS_2$ + small amt. of $WO_3$ |
| II | 72.32 | 9.7 | 17.18 | Mixture of $WO_3$+$WS_2$ |

EXAMPLE 6

16.7 g. of 12-tungstophosphoric acid was placed in a %O in a tube furnace. After a helium purge the sample was heated to 400 C. in a helium atmosphere. $H_2S$ was admitted for 15 minutes and the sample was cooled in a helium atmosphere. An electrode was fabricated using g. of catalyst and 4 g. of tantalum wool and this on a tantalum screen at 60,000 pounds on a 1-inch diameter ram. The electrode had an area of 4.59 cm.$^2$ Operating the anode under fuel cell conditions with a driven cathode at 85° C. the following electrode parameters were used. The anolyte contained 4.1 wt. percent HCl and 23.7 wt. percent paraformaldehyde.

| Current Density ma./cm.$^2$) | Electrode Potential vs. SCE (volt) |
|---|---|
| 0 | −0.13 |
| 10 | −0.08 |
| 20 | +0.01 |
| 30 | 0.18 |
| 35 | 0.40 |

Analysis of Catalyst

| %W | %O | %S | X-ray |
|---|---|---|---|
| 74.28 | 13.8 | 12.68 | $WS_2$ plus unidentified crystalline material |

EXAMPLE 7

A variety of tungsten-based catalyst compositions were prepared by reacting ammonium metatungstate with hydrogen sulfide at various temperatures and $H_2S$ times. All were prepared by putting 24 g. of ammonium metatungstate in a combustion boat and heating the sample to the desired temperature in a helium atmosphere after a helium purge. After equilibrating at the temperature, hydrogen sulfide was admitted for the desired time. At the end of the sulfiding time the atmosphere was changed to helium with the furnace being turned off simultaneously. Air can also be used in place of helium. The catalysts were fabricated into electrodes as described in example 6 except that 3 g. of catalyst was mixed with 4 g. of tantalum wool.

The electrodes were evaluated under the same conditions described in example 6 and the influence of time and temperature is shown in the following table:

| Catalyst | Temperature (° C.) | $H_2S$ Time (Minutes) | Electrode Potential vs. SCE Zero Current | Current Density at 0.3 v. vs. SCE (ma/cm.$^2$) |
|---|---|---|---|---|
| I | 350 | 10 | −0.10 | 44.0 |
| II | 500 | 15 | −0.12 | 65.0 |
| III | 400 | 15 | −0.13 | 49.0 |
| IV | 500 | 30 | −0.11 | 30.6 |
| V | 600 | 15 | −0.10 | 32.0 |
| VI | 475 | 15 | −0.11 | 46.0 |
| VII | 475 (Air) | 15 | −0.10 | 51.2 |

Analysis of Catalyst

| | %W | o/o O | %S | X-ray |
|---|---|---|---|---|
| I | 74.66 | 16.4 | 6.16 | $WO_3$; $WS_2$; [$(NH_4)_{0.66}$ $WO_3(H_2O)_{0.11}$]; UCM* |
| II | 69.50 | 13.6 | 12.66 | $WO_3$; $WS_2$ |
| III | 73.35 | 17.1 | 6.78 | $WO_3$; $WS_2$; [$(NH_4)_{0.66}$ $WO_3(H_2O)_{0.11}$]; UCM* |
| IV | 79.30 | 2.75 | 22.13 | $WO_3$; $WS_2$ |
| V | 74.09 | 7.0 | 17.56 | $WO_3$; $WS_2$ |
| VI | 68.52 | 9.8 | 20.03 | $WO_3$; $WS_2$ |
| VII | 70.38 | 7.1 | 24.22 | Strong $WS_2$, moderate $WO_3$ |

EXAMPLE 8

The catalyst described in example 7 as II (500° C./$H_2$S 15 minutes) was fabricated into a porous electrode by mixing 3 g. of catalyst, 1.5 g. Ta wool and 0.5 g. T-7 "Teflon" polytetrafluoroethylene resin and pressing the mixture on a tantalum screen at 6,000 pounds on a 1 inch ram. The resultant porous electrode was mounted in a holder which permitted gas access to the pores.

Operating the anode under fuel cell conditions in 2.5 N HCl electrolyte and using a driven cathode the following electrode parameters were observed at 85° C. when the anode was fueled with hydrogen.

| Current Density (ma./cm.$^2$) | Electrode Potential vs. SCE (volt) |
|---|---|
| 0 | −0.09 |
| 10 | −0.05 |
| 20 | −0.22 |
| 30 | +0.02 |
| 40 | 0.05 |
| 50 | 0.18 |
| 60 | 0.18 |
| 70 | 0.26 |
| 80 | 0.35 |

What is claimed is:

1. In a fuel cell comprising a housing, at least one fuel electrode, catalytic material associated with at least said fuel electrode, at least one oxidant electrode, at least one electrolyte, and connecting means associated with at least one fuel electrode and at least one oxidant electrode for establishing electrical contact with an external circuit, the improvement wherein the catalytic material associated with the fuel electrode comprises at least one acid-insoluble solid electrically conductive structure consisting essentially of at least one compound consisting essentially of oxygen and tungsten, wherein the valence of tungsten is four – six, and at least one sulfurated compound of said one compound operatively associated therewith wherein the valence of tungsten is four, at least a portion of said solid structure being exposed to the electrolyte and containing said sulfurated compound of tungsten, the ratio of oxygen-to-sulfur in said solid material being 80:1 –1:80.

2. A fuel cell as in claim 1 wherein the ratio of oxygen-to-sulfur in said catalytic material is 1:8 –20:1.

3. A fuel cell as in claim 1 wherein said catalytic material is associated with an electrically conductive base stratum.

4. A fuel cell as in claim 3 wherein said base stratum is a transition metal.

5. A fuel cell as in claim 3 wherein said base stratum is tantalum.

6. A fuel cell as in claim 3 wherein said base stratum is carbon.

7. A fuel cell as in claim 1 wherein said electrolyte is an acidic electrolyte.

8. A fuel cell electrode comprising an electrically conductive base stratum having applied thereto a catalytically effective amount of an acid-insoluble electrically conductive solid material consisting essentially of at least one compound consisting essentially of oxygen and tungsten, wherein the valence of tungsten is four– six, and at least one sulfurated compound of said one compound operatively associated therewith, wherein the valence of tungsten is 4, at least a portion of said solid material being exposable to an electrolyte and containing said sulfurated compound of tungsten, the ratio of oxygen-to-sulfur in said solid material being 80:1-1:80.

9. A fuel cell electrode as in claim 8 wherein the ratio of oxygen-to-sulfur in said solid material is 1:8 –20:1.

* * * * *